United States Patent
Fink (10) Patent No.: US 12,482,379 B2
(45) Date of Patent: Nov. 25, 2025

(54) DEMONSTRATION MODEL FOR OSTEOTOMY SURGICAL PROCEDURES

(71) Applicant: Apodeixis, LLC, Silver Spring, MD (US)

(72) Inventor: Owen Thompson Fink, Silver Spring, MD (US)

(73) Assignee: Apodeixis, LLC, Silver Spring, MD (US)

( * ) Notice: Subject to any disclaimer, the term of this patent is extended or adjusted under 35 U.S.C. 154(b) by 576 days.

(21) Appl. No.: 17/956,394

(22) Filed: Sep. 29, 2022

(65) Prior Publication Data

US 2023/0112580 A1    Apr. 13, 2023

Related U.S. Application Data

(60) Provisional application No. 63/253,485, filed on Oct. 7, 2021.

(51) Int. Cl.
  *G09B 23/30*   (2006.01)
  *G09B 23/32*   (2006.01)
  *G09B 23/34*   (2006.01)

(52) U.S. Cl.
  CPC ............. *G09B 23/32* (2013.01); *G09B 23/34* (2013.01)

(58) Field of Classification Search
  CPC ........ G09B 23/28; G09B 23/30; G09B 23/32; G09B 23/34
  USPC ......................................................... 434/274
  See application file for complete search history.

(56) References Cited

U.S. PATENT DOCUMENTS

| | | |
|---|---|---|
| 4,331,428 A | 5/1982 | Chandler |
| 4,677,973 A | 7/1987 | Slocum |
| 4,838,795 A * | 6/1989 | Draenert ............... A61F 2/4684 |
| | | 434/274 |
| 5,967,790 A | 10/1999 | Strover et al. |
| 6,361,729 B1 | 3/2002 | Strover et al. |
| 6,468,087 B2 | 10/2002 | Slocum |
| 6,524,111 B1 * | 2/2003 | Browne-Wilkinson ..................... |
| | | G09B 23/34 |
| | | 623/18.11 |
| 6,695,619 B2 | 2/2004 | Brown-Wilkinson |
| 6,908,309 B2 | 6/2005 | Gil et al. |
| 6,942,488 B2 | 9/2005 | Slocum |
| 7,384,268 B2 * | 6/2008 | Browne-Wilkinson ..................... |
| | | G09B 23/32 |
| | | 434/274 |
| 7,699,615 B2 * | 4/2010 | Sakezles ................ G09B 23/28 |
| | | 434/274 |

(Continued)

FOREIGN PATENT DOCUMENTS

AU            2008323521 A1    5/2009

*Primary Examiner* — Kurt Fernstrom
(74) *Attorney, Agent, or Firm* — Leveque Intellectual Property Law, P.C.

(57) ABSTRACT

A three-dimensional model for demonstrating an osteotomy surgical procedure is provided. The three-dimensional model includes a support, a first bone coupled to the support, and a second bone coupled to the support. The first bone includes a body defining a recess including a surface having an embedded magnet, a removable intermediate bone block disposed within the recess, and a removable surface bone block, disposed within the recess, including at least one embedded magnet. The removable intermediate bone block and the removable surface bone block are associated with the osteotomy surgical procedure.

15 Claims, 12 Drawing Sheets

(56) References Cited

U.S. PATENT DOCUMENTS

| | | | |
|---|---|---|---|
| 7,748,984 B2 * | 7/2010 | McAllister | G09B 23/30 |
| | | | 434/274 |
| 7,927,338 B2 | 4/2011 | Laffargue et al. | |
| 8,388,351 B2 * | 3/2013 | Potti Cuervo | G09B 23/32 |
| | | | 434/274 |
| 8,425,234 B2 | 4/2013 | Sakezles | |
| 8,977,021 B2 | 3/2015 | Kang et al. | |
| 9,622,802 B2 | 4/2017 | Embleton et al. | |
| 9,916,775 B2 * | 3/2018 | McInnis | G09B 23/32 |
| 10,076,321 B2 | 9/2018 | Crane et al. | |
| 10,325,523 B2 * | 6/2019 | Wilson | G09B 9/00 |
| 10,952,753 B2 * | 3/2021 | McAuliffe | A61B 17/157 |
| 10,971,037 B2 * | 4/2021 | Brady | G09B 23/32 |
| 2005/0014114 A1 * | 1/2005 | Slocum | G09B 23/32 |
| | | | 434/267 |
| 2006/0229621 A1 | 10/2006 | Cadmus | |
| 2008/0286736 A1 * | 11/2008 | Browne-Wilkinson | |
| | | | G09B 23/32 |
| | | | 623/18.11 |
| 2012/0202180 A1 | 8/2012 | Stock et al. | |
| 2014/0030682 A1 | 1/2014 | Thilenius | |
| 2017/0287364 A1 * | 10/2017 | Price | G09B 23/34 |
| 2018/0125550 A1 | 5/2018 | Shenoy et al. | |
| 2018/0235641 A1 | 8/2018 | McAuliffe et al. | |
| 2018/0342180 A1 | 11/2018 | Brady | |
| 2018/0360442 A1 | 12/2018 | Crane et al. | |
| 2019/0269514 A1 | 9/2019 | Sidebotham et al. | |
| 2023/0306876 A1 * | 9/2023 | D'Amico | G09B 23/34 |
| 2024/0144845 A1 * | 5/2024 | Morgan | G09B 23/30 |
| 2024/0404431 A1 * | 12/2024 | Chakfe | G09B 23/32 |

\* cited by examiner

DEMONSTRATION MODEL FOR OSTEOTOMY SURGICAL PROCEDURES

CROSS-REFERENCE TO RELATED APPLICATIONS

This application claims the benefit of U.S. provisional patent application Ser. No. 63/253,485 (filed on Oct. 7, 2021), the contents of which is incorporated herein by reference in its entirety.

BACKGROUND

The present disclosure relates to demonstration models. More particularly, the present disclosure relates to a demonstration model for an osteotomy surgical procedure.

Some approaches to demonstrate and provide instruction for surgical procedures use human and/or animal cadavers, such as canine, porcine, or bovine cadaver specimens. While helpful, these cadaver specimens are often very costly and may create biohazard waste issues. Furthermore, the usefulness of cadaver models may be limited. For example, although cadaver tissues provide an accurate representation of anatomical geometry, the required chemical preservation, such as embalming fluid, which may include formaldehyde, methanol, glutaraldehyde, greatly alters the physical properties of the tissues. Therefore, it would be useful to provide an improved approach to demonstrate surgical procedures that does not rely upon cadavers.

DETAILED DESCRIPTION

Embodiments of the present disclosure will now be described with reference to the drawing figures, in which like reference numerals, characters and labels refer to like parts throughout.

Embodiments of the present disclosure advantageously provide three dimensional, transforming demonstration models that illustrate the way different osteotomy surgical procedures change the geometry of the relevant bones from a pre-surgical state to a post-surgical state.

More particularly, embodiments of the present disclosure provide a three dimensional, transforming model used to demonstrate to dog owners the roles of the quadriceps muscle, the femur, the patella, and the patellar tendon in a dog's knee (stifle), the destabilizing effect that a deformation of the femur has on the knee (patellar luxation), and the ways that surgical procedures change the joint geometry to return the knee to a stable condition.

A dog's knee consists of three main bones, the femur, the tibia and the kneecap or patella. On the front of the knee above the patella is connected to the big muscle on the front of the thigh, the quadriceps, and below it continues as the patellar tendon that comes down and attaches to a point on the front of the tibia, the tibial tuberosity.

The patella rides in a groove on the front of the femur called the patellar groove. There are two main forces that keep the patella tracking normally in the groove. First, the groove must be deep enough with walls that are high enough to contain the patella. Second, the mechanism from the muscle through the patella tendon and then down to the tibia must be in a straight line right through the middle of the groove. When the bones are the correct shape, this mechanism works beautifully as a pulley allowing the muscle to generate strong extension forces for running and jumping.

Occasionally the femur of the knee may be subtly deformed with a small amount of abnormal bend. The knee can tolerate this to a certain degree; however, if things are off just slightly more, the patella can pop out of place. This dislocation is called patellar luxation.

Depending on the specific shape of the deformity the patella can luxate either to the outside or, more commonly, to the inside; this is called medial patellar luxation. When the patella is luxated it causes several problems. First, the knee no longer has its strong extension mechanism, so the leg tends to be very weak and almost collapse. Second, as the patella rubs back and forth in this abnormal location it wears away the cartilage leading to chronic pain and arthritis. And finally, when the knee doesn't have the normal front support of this mechanism other ligaments in the knee like the anterior cruciate ligament (ACL) are put under abnormal stress and can become damaged secondarily, depending on the severity of the patellar luxation and the degree to which it is affecting the dog. Surgery is often recommended to correct the problem and the goal of the surgery is to get the patella tracking stably in its normal location.

Figure 1:
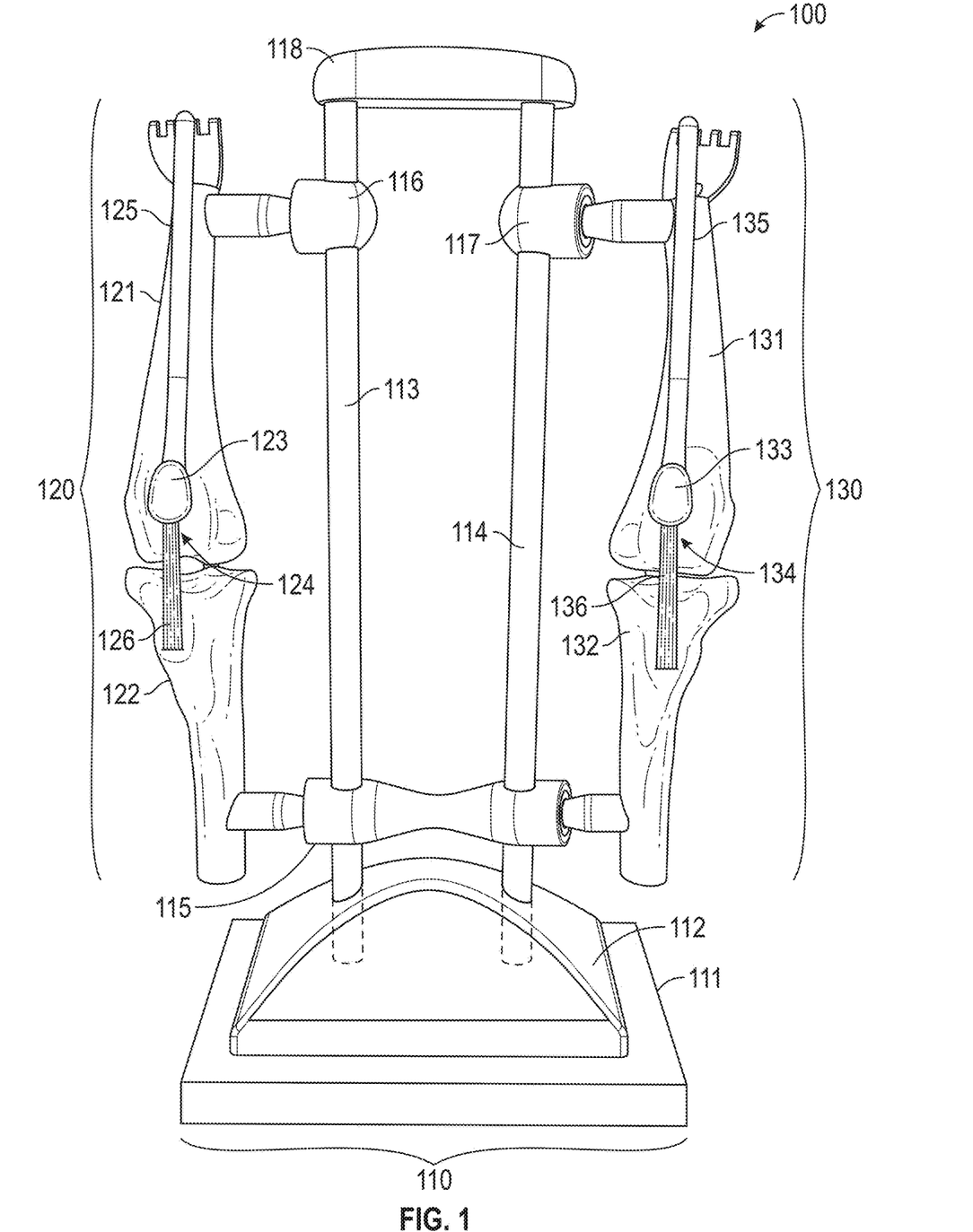
FIG. 1 depicts a front view of a patellar luxation demonstration model, in accordance with embodiments of the present disclosure.

FIG. 1 depicts a front view of demonstration model 100, in accordance with embodiments of the present disclosure.

In one embodiment, demonstration model 100 includes support 110, healthy knee 120 and diseased knee 130.

Support 110 includes base 111, cover 112, vertical member 113, vertical member 114, fixed element 115, movable element 116, movable element 117, and fixed element 118. In certain embodiments, base 111, vertical member 113 and vertical member 114 are wood, and cover 112, fixed element 115, movable element 116, movable element 117 and fixed element 118 are plastic formed, for example, by 3D printing, injection molding, etc. In other embodiments, all of the components are plastic; other materials are also supported.

Generally, fixed element 118 may be used as a handle for transporting demonstration model 100. Cover 112 may depict the name of the modeled surgical procedure, as well as the name of the customer (practice, vendor, etc.). Base 111 and cover 112 may cooperate to provide at least one storage compartment, for storing intermediate bone block 142 once femur 131 is transformed to the post-operative state.

Vertical member 113 has a lower end attached to base 111 (depicted by dotted portion), a lower portion attached to fixed element 115, an upper portion and an upper end attached to fixed element 118. Vertical member 114 has a lower end attached to base 111 (depicted by dotted portion), a lower portion attached to fixed element 115, an upper portion and an upper end attached to fixed element 118.

Movable element 116 is slidingly displaceable along vertical member 113 from the upper portion of vertical member 113 to the lower portion of vertical member 113, i.e., the length of travel. Securing or locking movable element 116 along the length of travel may provided by friction between movable element 116 and vertical member 113, a ratcheting system, a keyway and spring-loaded key, etc. Similarly, movable element 117 is slidingly displaceable along vertical member 114 from the upper portion of vertical member 114 to the lower portion of vertical member 114, i.e., the length of travel. Securing or locking movable element 117 along the length of travel may provided by friction between movable element 117 and vertical member 114, a ratcheting system, a keyway and spring-loaded key, etc.

Healthy knee 120 includes femur 121, tibia 122, patella 123, patellar groove 124, quadriceps muscle 125, and patellar tendon 126. Generally, femur 121 has a body with an upper portion and a lower portion, and tibia 122 has a body with an upper portion and a lower portion. The upper portion of femur 121 is rotatably coupled to movable element 116 by a bearing, ball-and-socket joint, etc. Similarly, the lower portion of tibia 122 is rotatably coupled to fixed element 115 by a bearing, ball-and-socket joint, etc.

Diseased knee 130 includes femur 131, tibia 132, patella 133, patellar groove 134, quadriceps muscle 135, and patellar tendon 136. Generally, femur 131 has a body with an upper portion and a lower portion, and tibia 132 has a body with an upper portion and a lower portion. The upper portion of femur 131 is rotatably coupled to movable element 116 by a bearing, ball-and-socket joint, etc. Similarly, the lower portion of tibia 132 is rotatably coupled to fixed element 115 by a bearing, ball-and-socket joint, etc.

Quadriceps muscle 125, 135 may be manufactured from an elastic material, such as, for example, natural rubber, synthetic rubber, silicone rubber, etc. Other materials are also contemplated. Patellar tendons 126, 136 may be manufactured from a flexible yet relatively inelastic material, such as, for example, fiber, cord, string, cloth, etc. Other materials are also contemplated.

Other embodiments of demonstration model 100 include diseased knee 130 and support 110 with base 111, cover 112, vertical member 113, a smaller version of fixed element 115 and movable element 116. In these embodiments, healthy knee 120, vertical member 114, movable element 117 and fixed element 118 are not included.

Figure 2A:
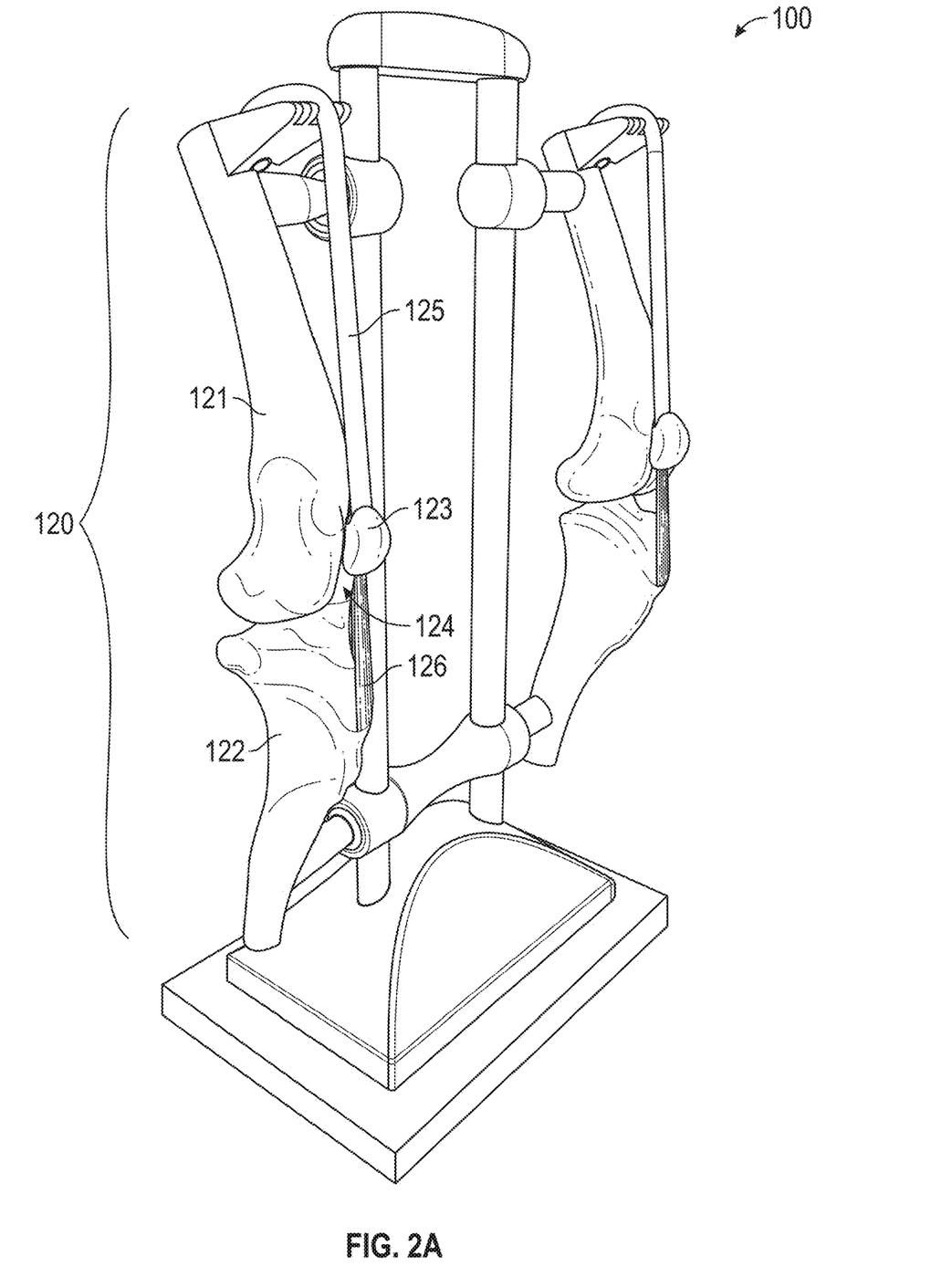
FIG. 2A depicts a front oblique view of the demonstration model, in accordance with embodiments of the present disclosure.

FIG. 2A depicts a front oblique view of demonstration model 100, in accordance with embodiments of the present disclosure. In this oblique view, healthy knee 120, femur 121, tibia 122, patella 123, patellar groove 124, quadriceps muscle 125 and patellar tendon 126 are identified.

Figure 2B:
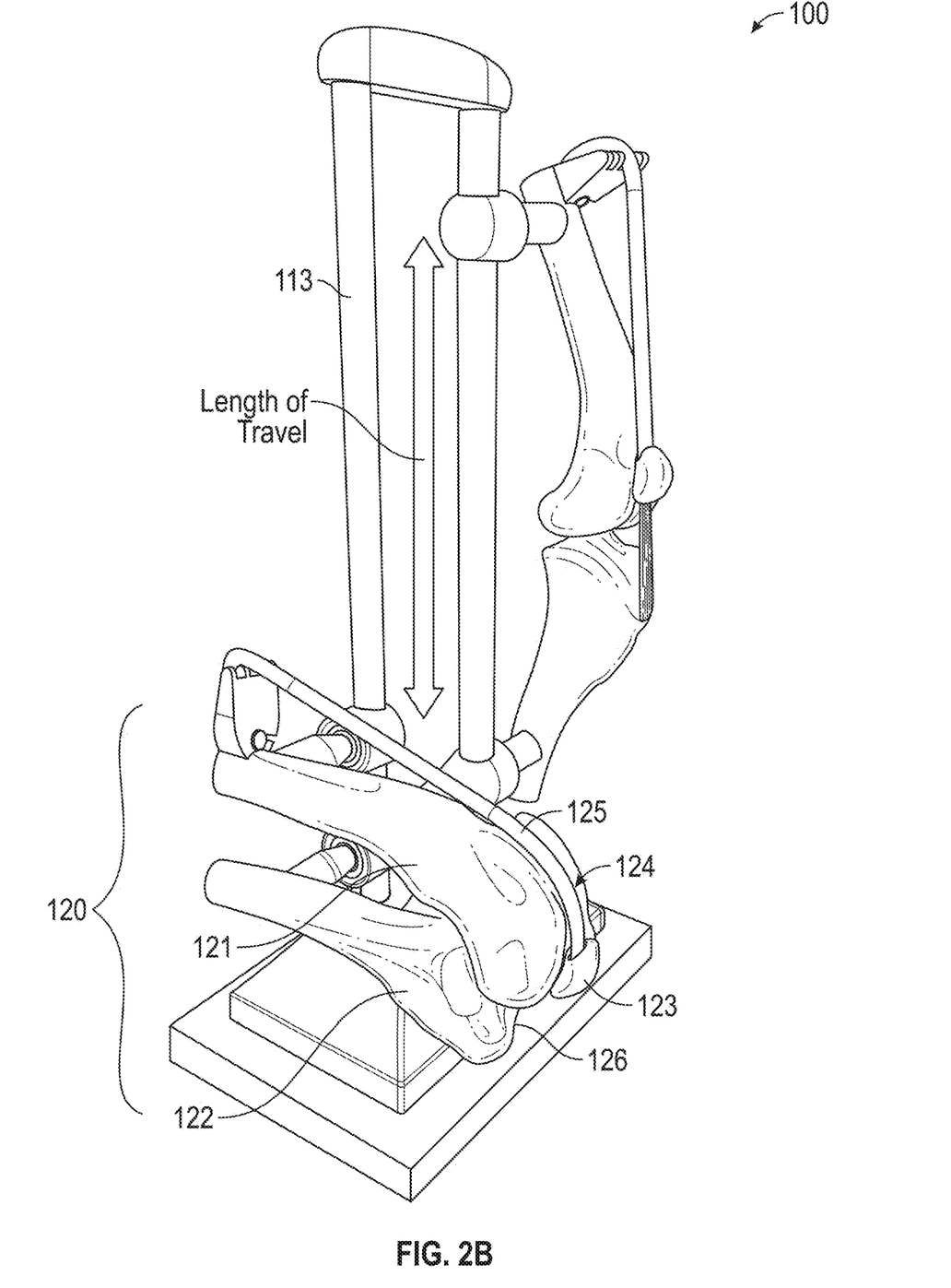
FIG. 2B depicts a front oblique view of the demonstration model with the healthy knee flexed, in accordance with embodiments of the present disclosure.

FIG. 2B depicts a front oblique view of demonstration model 100 with healthy knee 120 flexed, in accordance with embodiments of the present disclosure. In this oblique view, healthy knee 120, femur 121, tibia 122, patella 123, patellar groove 124, quadriceps muscle 125 and patellar tendon 126 are identified. The length of travel along vertical member 113 is also depicted.

Figure 3A:
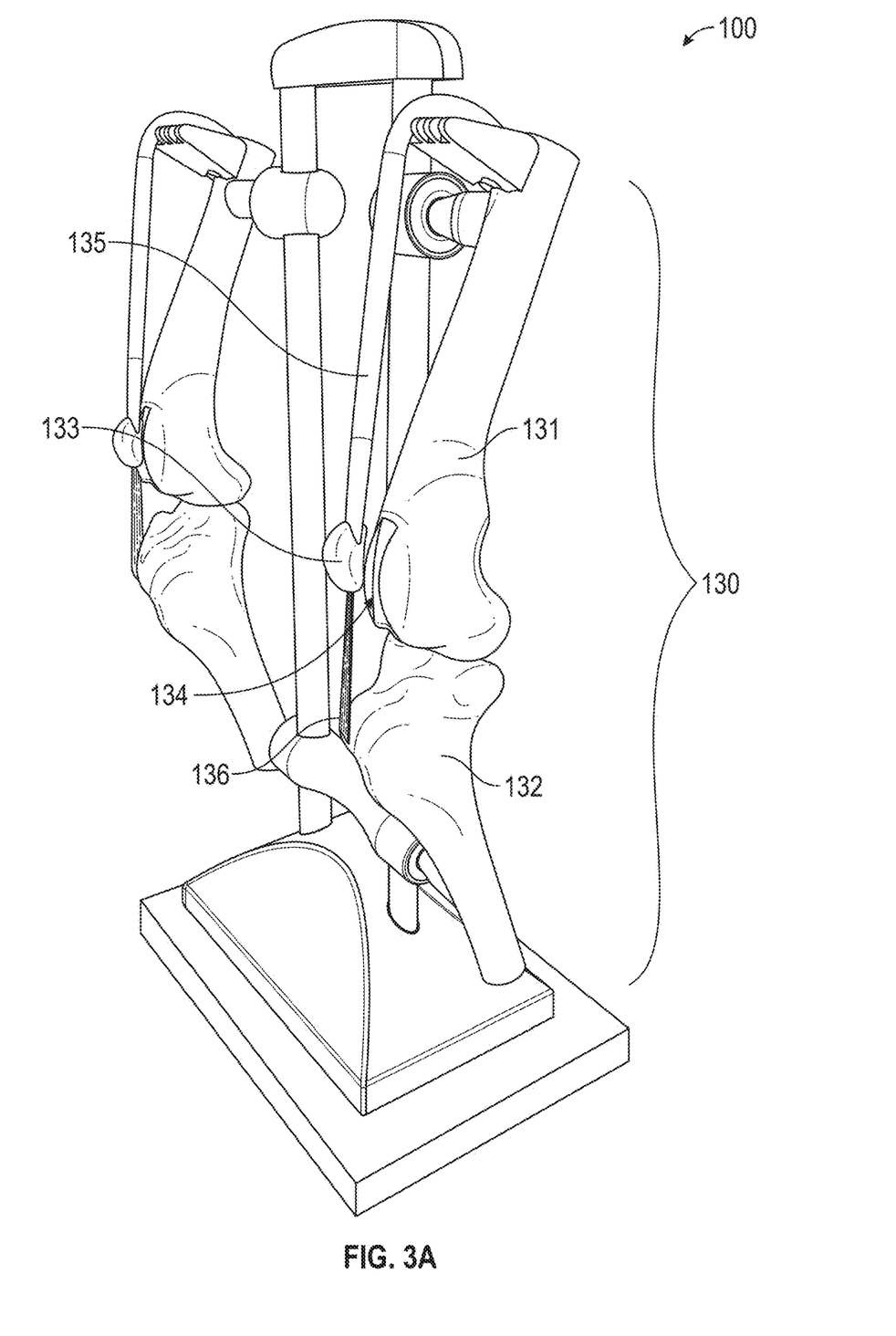
FIG. 3A depicts a front oblique view of the demonstration model, in accordance with embodiments of the present disclosure.

FIG. 3A depicts a front oblique view of demonstration model 100, in accordance with embodiments of the present disclosure. In this oblique view, diseased knee 130, femur 131, tibia 132, patella 133, patellar groove 134, quadriceps muscle 135 and patellar tendon 136 are identified. Patella 133 has been dislocated from the patellar groove 134 to the inside of diseased knee 130, i.e., a medial patellar luxation.

Figure 3B:
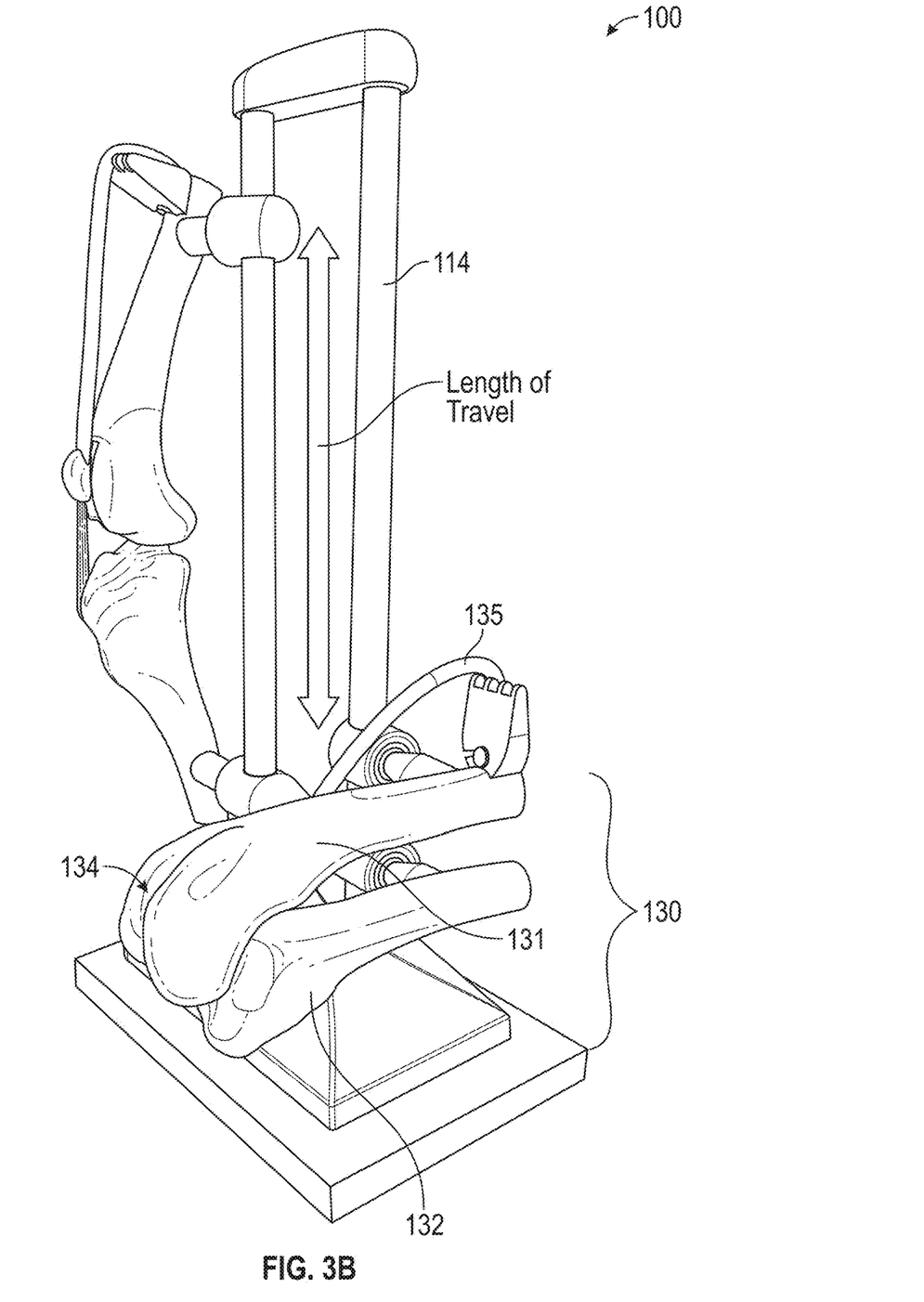
FIG. 3B depicts a front oblique view of the demonstration model with the diseased knee flexed and the patella dislocated to the inside, in accordance with embodiments of the present disclosure.

FIG. 3B depicts a front oblique view of demonstration model 100 with diseased knee 130 flexed and patella 133 dislocated to the inside (not visible), in accordance with embodiments of the present disclosure. In this oblique view, diseased knee 130, femur 131, tibia 132, patellar groove 134 and quadriceps muscle 135 are identified. The length of travel along vertical member 114 is also depicted.

Though the origin of the problem was a bent femur, surgically straightening this bone is rarely attempted. This is simply because straightening a femur is quite an invasive, and somewhat riskier, operation. Advantageously, a combination of smaller adjustments in the knee itself will usually correct the problem without needing to straighten the femur.

The first adjustment, trochleoplasty, is to deepen the patellar groove so that the patella is less likely to pop out. A portion of this bone is cut out, some thickness is removed (i.e., the bottom piece), and the surface piece is replaced (i.e., the top piece), which now sits down more deeply, where it makes nice, high walls. The tension of the soft tissues on the sides of the patella may also be adjusted, loosening it on one side and tightening it on the other, to bring the patella back to the center.

Figure 4A:
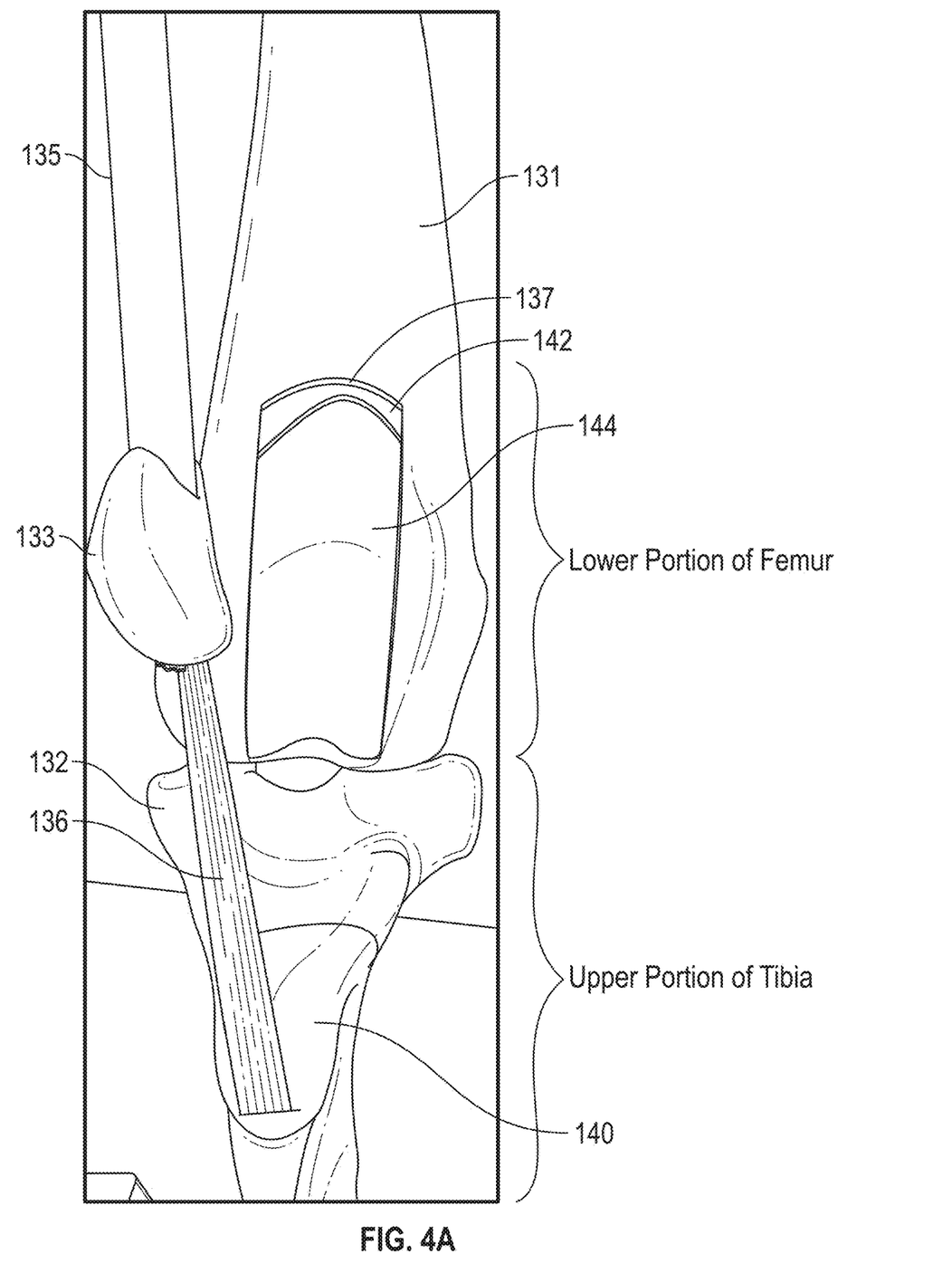
FIG. 4A depicts a front view of the diseased knee of the demonstration model with removable top and bottom pieces installed in the patellar groove and the patella dislocated, in accordance with embodiments of the present disclosure.

FIG. 4A depicts a front view of diseased knee 130 of demonstration model 100 with removable intermediate bone block 142 (i.e., the bottom piece) and removable surface bone block 144 (i.e., the top piece) installed in recess 137 with patella 133 dislocated to the inside, in accordance with embodiments of the present disclosure. Femur 131 has a body with a lower portion that defines recess 137, which receives intermediate bone block 142 and surface bone block 144. Magnets embedded within the surface of recess 137 and the rear surface of surface bone block 144 removably secure these components in place to form "original" patellar groove 134. Other types of attachments are also supported, such as, for example, interference fits, hook-andloop fasteners, interlocking fasteners, snap fasteners, clips, studs, pins, keys, etc. Tibia tuberosity 140, in an "original" position, is identified (discussed in more detail below), as well as femur 131, tibia 132, quadriceps muscle 135 and patellar tendon 136. The "original" position of tibia tuberosity 140 is generally in-line with the lower portion of femur 131.

In certain embodiments, intermediate bone block 142 also includes one or more embedded magnets for removably securing intermediate bone block 142 within recess 137 and surface bone block 144 to intermediate bone block 142. In one embodiment, intermediate bone block 142 includes one magnet oriented to magnetically couple to the magnet within the surface of recess 137 and another magnet, offset from the other magnet, oriented to magnetically couple to the magnet within surface bone block 144.

Figure 4B:
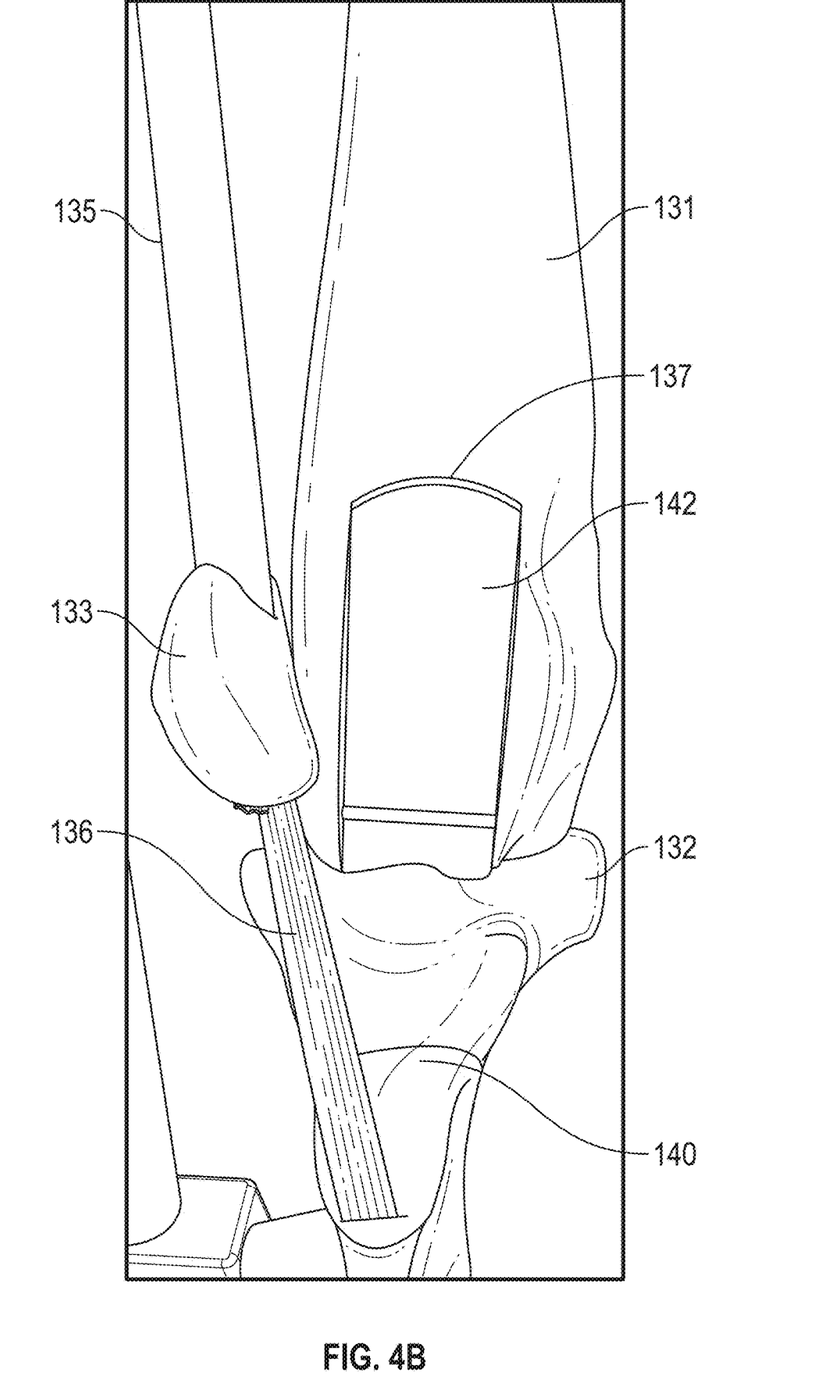
FIG. 4B depicts a front view of the diseased knee of the demonstration model with the top piece removed and the patella displaced, in accordance with embodiments of the present disclosure.

FIG. 4B depicts a front view of diseased knee 130 of demonstration model 100 with surface bone block 144 removed and patella 133 dislocated to the inside, in accordance with embodiments of the present disclosure. Intermediate bone block 142 is visible within recess 137. Tibia tuberosity 140, in the "original" position, is identified (discussed in more detail below), as well as femur 131, tibia 132, quadriceps muscle 135 and patellar tendon 136.

Figure 4C:
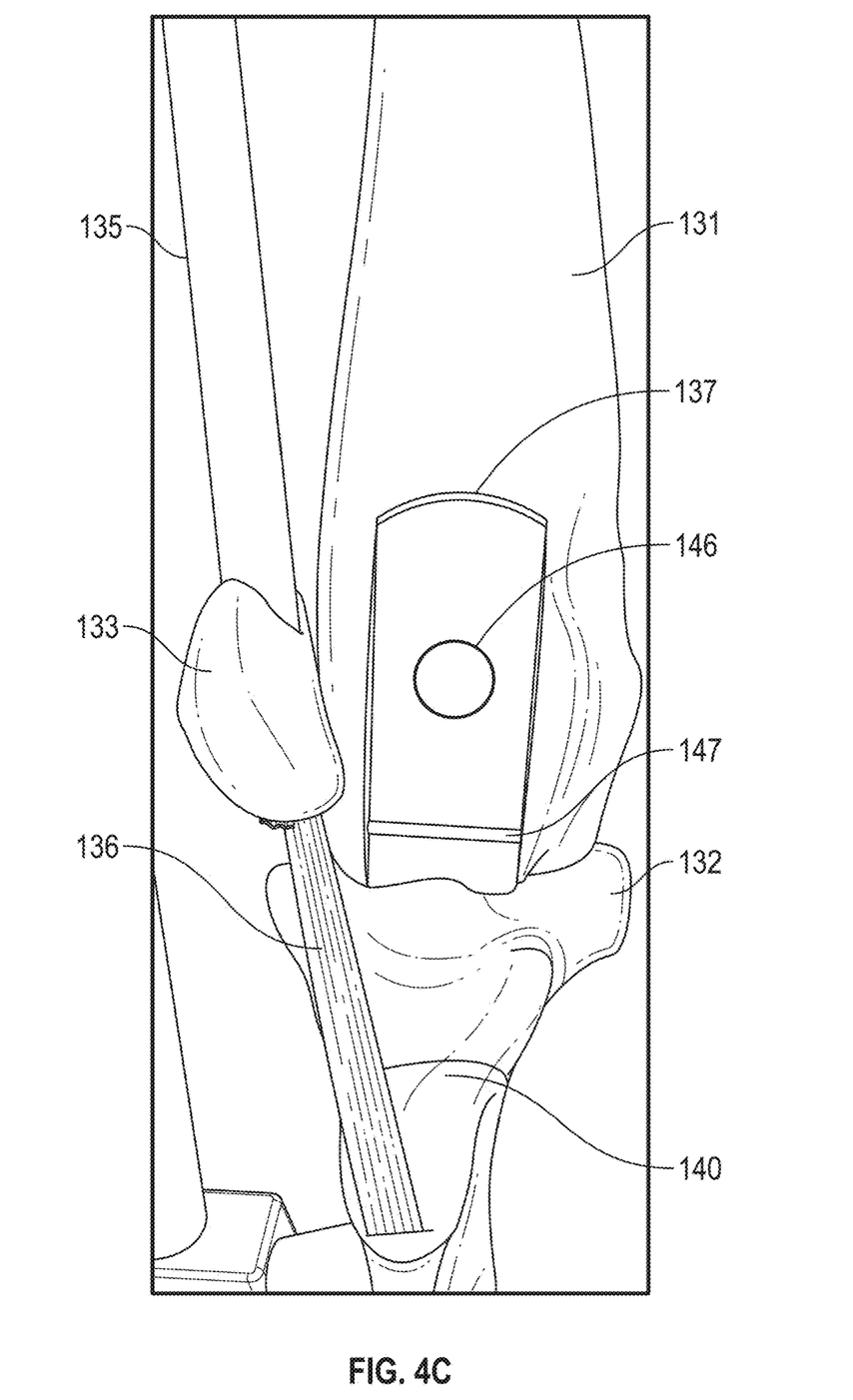
FIG. 4C depicts a front view of the diseased knee of the demonstration model with the top and bottom pieces removed and the patella displaced, in accordance with embodiments of the present disclosure.

FIG. 4C depicts a front view of diseased knee 130 of demonstration model 100 with intermediate bone block 142 and surface bone block 144 removed and patella 133 dislocated to the inside, in accordance with embodiments of the present disclosure. Magnet 146 is embedded in the surface of recess 137, tibia tuberosity 140, in the "original" position, is identified (discussed in more detail below), as well as femur 131, tibia 132, quadriceps muscle 135 and patellar tendon 136. Ridge 147 interfaces with respective recesses in the bottom surfaces of intermediate bone block 142 and surface bone block 144.

Figure 5A:
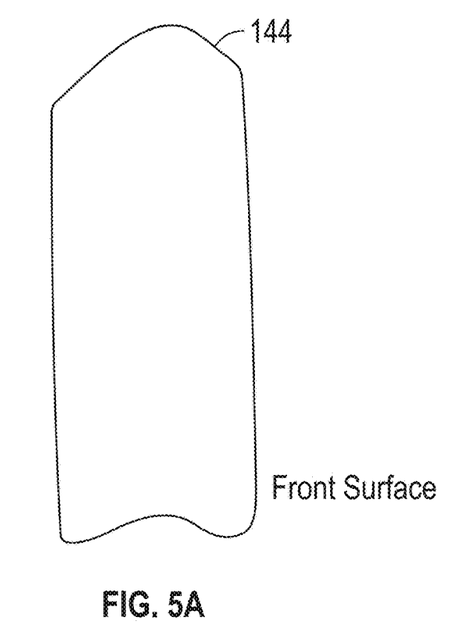
FIG. 5A depicts a front surface of the top piece of the demonstration model, in accordance with embodiments of the present disclosure.

FIG. 5A depicts the front surface of surface bone block 144 of demonstration model 100, in accordance with embodiments of the present disclosure.

Figure 5B:
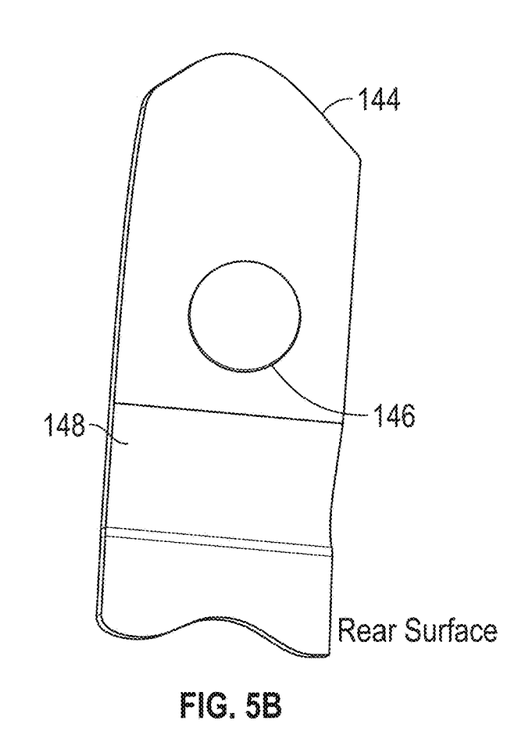
FIG. 5B depicts a back surface of the top piece of the demonstration model, in accordance with embodiments of the present disclosure. An embedded magnet is partially exposed in a central region of the back surface of the top piece.

FIG. 5B depicts the rear surface of surface bone block 144 of demonstration model 100, in accordance with embodiments of the present disclosure. Embedded magnet 146 is partially exposed in a central region of the rear surface of surface bone block 144, and recess 148 interfaces with ridge 147 in recess 137.

Figure 6A:
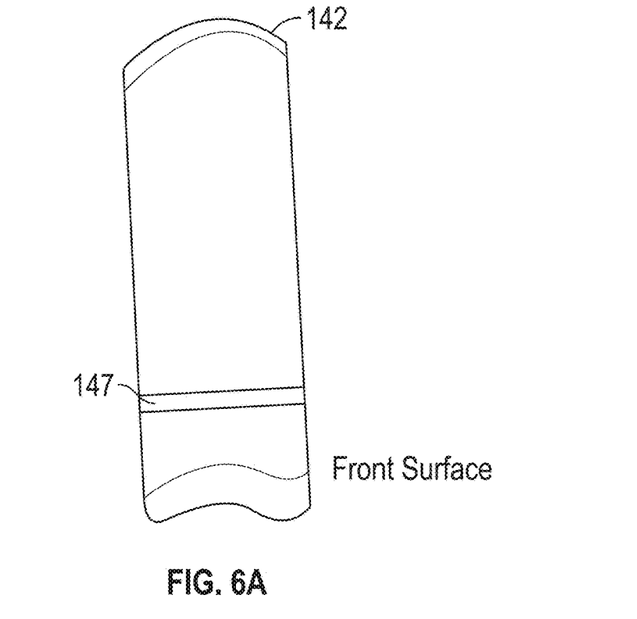
FIG. 6A depicts a front surface of the bottom piece of the demonstration model, in accordance with embodiments of the present disclosure.

FIG. 6A depicts the front surface of intermediate bone block 142 of demonstration model 100, in accordance with embodiments of the present disclosure. Ridge 147 interfaces with recess 148 in the rear surface of surface bone block 144.

Figure 6B:
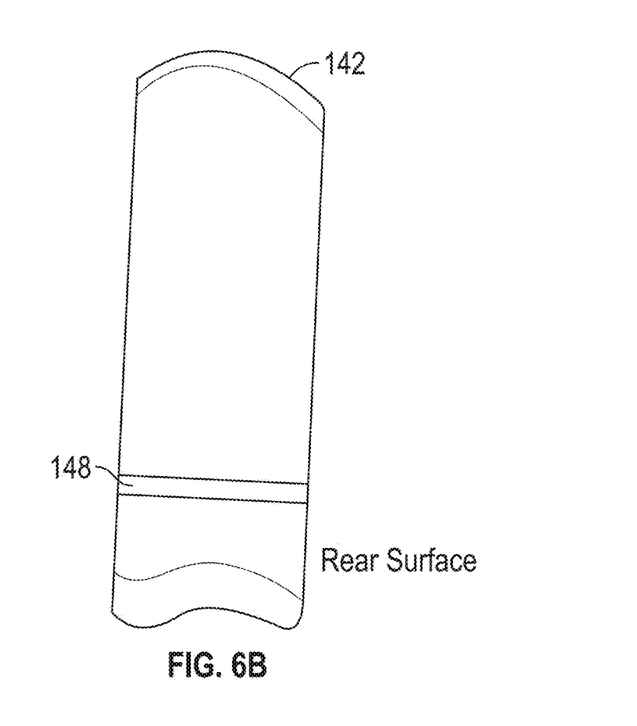
FIG. 6B depicts a back surface of the bottom piece of the demonstration model, in accordance with embodiments of the present disclosure.

FIG. 6B depicts the rear surface of intermediate bone block 142 of demonstration model 100, in accordance with embodiments of the present disclosure. Recess 148 interfaces with ridge 147 in recess 137.

Figure 7:
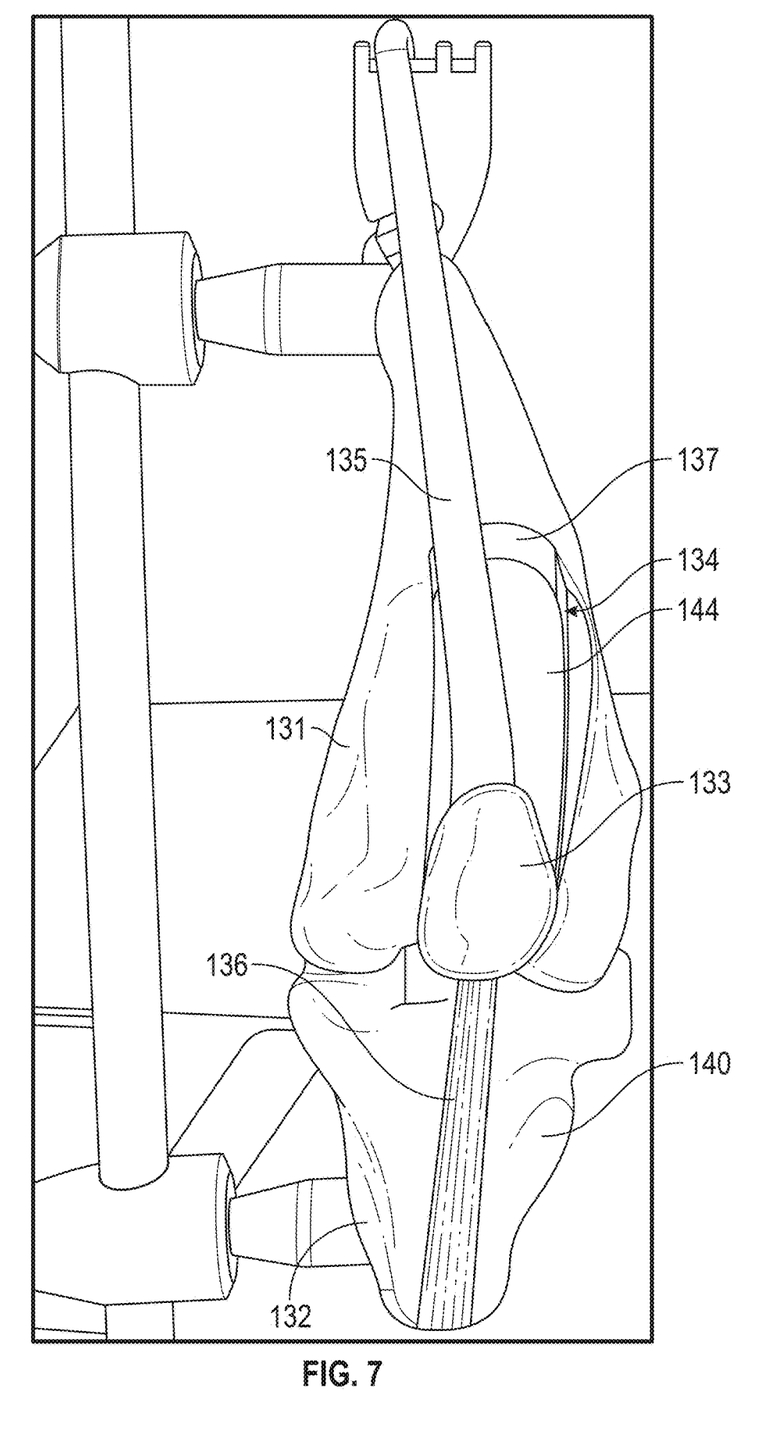
FIG. 7 depicts a front view of the diseased knee of the demonstration model with the top piece reinstalled in place of the bottom piece, in accordance with embodiments of the present disclosure.

FIG. 7 depicts a front view of diseased knee 130 of demonstration model 100 with surface bone block 144 reinstalled in recess 137 without intermediate bone block 142, in accordance with embodiments of the present disclosure. Magnets 146 (depicted in FIGS. 4C and 5B) secure surface bone block 144 within recess 137. As can be seen, surface bone block 144 is more deeply secured within recess 137, and the combination of surface bone block 144 and recess 137 form "improved" patellar groove 134 with nice, high walls. Femur 131, tibia 132, quadriceps muscle 135 and patellar tendon 136 are also identified.

In some cases, these steps alone are sufficient to resolve the problem. In other cases, the patella will still luxate, and this is because it's still being pulled by the misalignment of this entire mechanism. To get that mechanism straight the attachment point of the tendon on the tibia is adjusted, via lateral tibial tuberosity transposition, i.e., a cut is made in the bone, the portion of the bone (i.e., the tibial tuberosity) that includes the attachment point of the tendon is moved to the side, and this portion of the bone is reattached in this new location. Now the mechanism is in a straight line through the groove and the patella tracks perfectly.

Figure 8:
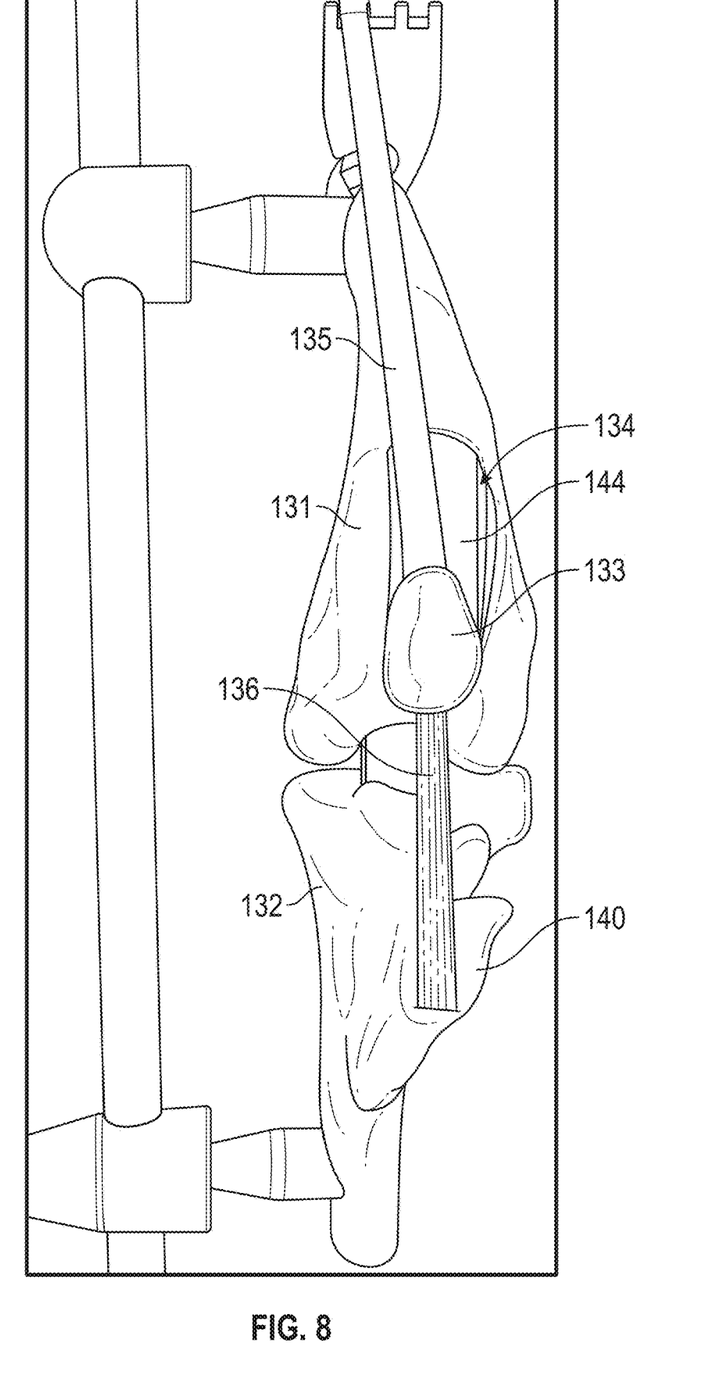
FIG. 8 depicts a front view of the diseased knee of the demonstration model with tibia tuberosity shifted and diseased knee partially flexed, in accordance with embodiments of the present disclosure.

FIG. 8 depicts a front view of diseased knee 130 of demonstration model 100 with tibia tuberosity 140 disposed in an "improved" position and diseased knee 130 partially flexed, in accordance with embodiments of the present disclosure.

Femur 131, tibia 132, patella 133, "improved" patellar groove 134, quadriceps muscle 135, patellar tendon 136 and surface bone block 144 are also identified. The "improved" position of tibia tuberosity 140 is generally canted with respect to the lower portion of femur 131. Tibia tuberosity 140 is movable coupled to the body of tibia 132, and is held in place, in each position, by a pivot (not shown for clarity), a registration key (not shown for clarity), and tension provided by patellar tendon 136.

Diseased knee 130 of demonstration model 100 can be fixed in place at any position from full flexion to full extension. Additionally, demonstration model 100 advantageously transforms between an injured, pre-operative state, and the post-operative state, i.e., intermediate bone block 142 can be removed, and surface bone block 144 recessed to demonstrate how trochleoplasty surgery deepens patellar groove 134, helping correct the medial patellar luxation. Similarly, tibia tuberosity 140 can be pivoted from its anatomic, "original" or "before surgery" position (a pre-operative state), to a lateralized, "improved" or "after surgery" position (a post-operative state) to demonstrate how lateral tibial tuberosity transposition surgery corrects the alignment of the quadriceps mechanism, helping correct the medial patellar luxation.

In many embodiments, healthy knee 120 may be used to illustrate the normal bending of the knee joint, the articulation path of the normal patella and the strength provided by the normal quadriceps mechanism. In this way the healthy knee joint may be compared to a "before surgery" or "after surgery" joint.

Advantageously, demonstration model 100 illustrates, inter alia:
the normal action of the knee joint and the normal role of the quadriceps, patella, and patellar tendon;
how a subtle bend in the femur, malalignment of the quadriceps mechanism, and a shallow patellar groove all contribute to medial patellar luxation; and
the steps of the trochleoplasty and lateral tibial tuberosity transposition surgical procedures, and how the procedures restore the stability of the joint.

Diseased knee 130 (i.e., the "medial patellar luxation" knee) of demonstration model 100 articulates, and demonstrates how a subtle bend in the femur, malalignment of the quadriceps mechanism, and a shallow patellar groove all contribute to medial patellar luxation. This also shows how the medial patellar luxation causes weakness in the leg and chronic abrasive cartilage wear in the joint.

The following embodiments are combinable.

In one embodiment, a three-dimensional model for demonstrating a surgical procedure correcting patellar luxation, includes a support including a base, a vertical member attached to the base, a fixed element attached to the vertical member, and a movable element slidingly displaceable along the vertical member and a knee, including a femur with a body having an upper portion rotatably coupled to the movable element, and a lower portion defining a recess including a surface having an embedded magnet an intermediate bone block removably disposed within the recess, and a surface bone block, including an embedded magnet, removably disposed within the recess, a tibia including a body having an upper portion and a lower portion rotatably coupled to the fixed element, a tibia including a body having an upper portion and a lower portion rotatably coupled to the fixed element, a patella, a quadriceps muscle coupled to the patella and the upper portion of the femur body, and a quadriceps muscle coupled to the patella and the upper portion of the femur body, and a patellar tendon coupled to the patella and the upper portion of the tibia body.

A further embodiment is the three-dimensional where the surface bone block has a first position associated with a pre-operative state and a second position associated with a post-operative state where in the first position, the surface bone block is located on the intermediate bone block within the recess; and in the second position, the surface bone block is located on the recess surface.

Another embodiment is the three-dimensional model where the quadriceps muscle is an elastic material, and the patellar tendon is an inelastic material.

Another embodiment is the three-dimensional model where the upper portion of the tibia includes a movable tibia tuberosity coupled to the patella tendon.

A further embodiment is the three-dimensional model where the upper portion of the tibia includes a movable tibia tuberosity coupled to the patella tendon.

A further embodiment is the three-dimensional model where the tibia tuberosity has a first position associated with a pre-operative state and a second position associated with a post-operative state, in the first position, the tibia tuberosity is in-line with respect to the lower portion of the femur, and in the second position, the tibia tuberosity is canted with respect to the lower portion of the femur.

Another embodiment is the three-dimensional model where the tibia tuberosity is movably coupled to the tibia body using a pivot, a registration key and tension of the patellar tendon.

Another embodiment is the three-dimensional model where the intermediate bone block includes at least one embedded magnet.

In one embodiment a three-dimensional model for demonstrating a surgical procedure correcting patellar luxation includes a support including a base, a pair of vertical members attached to the base, a fixed element attached to each vertical member, and a movable element slidingly displaceable along each vertical member and a healthy knee, including a femur including a lower portion and an upper portion rotatably coupled to one movable element, a tibia including an upper portion and a lower portion rotatably coupled to the fixed element, a patella, a quadriceps muscle coupled to the patella and the upper portion of the femur, and a patellar tendon coupled to the patella and the upper portion of the tibia, and a diseased knee, including a femur with a body having an upper portion rotatably coupled to the other movable element, and a lower portion defining a recess including a surface having an embedded magnet, an intermediate bone block removably disposed within the recess, and a surface bone block, including an embedded magnet, removably disposed within the recess, and a tibia including a body having an upper portion and a lower portion rotatably coupled to the fixed element, a patella, a quadriceps muscle coupled to the patella and the upper portion of the femur body, and a patellar tendon coupled to the patella and the upper portion of the tibia body.

Another embodiment is the three-dimensional model where the surface bone block has a first position associated with a pre-operative state and a second position associated with a post-operative state and in the first position, the surface bone block is located on the intermediate bone block within the recess; and in the second position, the surface bone block is located on the recess surface.

Another embodiment is the three-dimensional model where the quadriceps muscles are an elastic material, and the patellar tendons are an inelastic material.

A further embodiment is the three-dimensional model where the upper portion of the tibia of the diseased knee includes a movable tibia tuberosity coupled to the patella tendon.

A further embodiment is the three-dimensional model where the tibia tuberosity has a first position associated with a pre-operative state and a second position associated with a post-operative state and in the first position, the tibia tuberosity is in-line with respect to the lower portion of the femur of the diseased knee, and in the second position, the tibia tuberosity is canted with respect to the lower portion of the femur of the diseased knee.

Another embodiment is the three-dimensional model where the tibia tuberosity is movably coupled to the tibia body using a pivot, a registration key and tension of the patellar tendon.

Another embodiment is the three-dimensional model according to claim 9, where the intermediate bone block includes at least one embedded magnet.

In one embodiment a three-dimensional model for demonstrating an osteotomy surgical procedure includes a support, a first bone, coupled to the support, including a body defining a recess including a surface having an embedded magnet, a removable intermediate bone block disposed within the recess, and a removable surface bone block, disposed within the recess, including at least one embedded magnet, and a second bone coupled to the support, where the removable intermediate bone block and the removable surface bone block are associated with the osteotomy surgical procedure.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:
1. A three-dimensional model for demonstrating a surgical procedure correcting patellar luxation, comprising:
   a support including:
      a base, a vertical member attached to the base, a fixed element attached to the vertical member, and a movable element slidingly displaceable along the vertical member; and
a knee, including:
a femur including:
a body having an upper portion rotatably coupled to the movable element, and a lower portion defining a recess including a surface having an embedded magnet,
an intermediate bone block removably disposed within the recess, and
a surface bone block, including an embedded magnet, removably disposed within the recess,
a tibia including a body having an upper portion and a lower portion rotatably coupled to the fixed element,
a patella,
a quadriceps muscle coupled to the patella and the upper portion of the femur body, and
a patellar tendon coupled to the patella and the upper portion of the tibia body.

2. The three-dimensional model according to claim 1, where:
the surface bone block has a first position associated with a pre-operative state and a second position associated with a post-operative state;
in the first position, the surface bone block is located on the intermediate bone block within the recess; and
in the second position, the surface bone block is located on the recess surface.

3. The three-dimensional model according to claim 2, where the quadriceps muscle is an elastic material, and the patellar tendon is an inelastic material.

4. The three-dimensional model according to claim 3, where the upper portion of the tibia includes a movable tibia tuberosity coupled to the patella tendon.

5. The three-dimensional model according to claim 4, where:
the tibia tuberosity has a first position associated with a pre-operative state and a second position associated with a post-operative state;
in the first position, the tibia tuberosity is in-line with respect to the lower portion of the femur; and
in the second position, the tibia tuberosity is canted with respect to the lower portion of the femur.

6. The three-dimensional model according to claim 5, where the tibia tuberosity is movably coupled to the tibia body using a pivot, a registration key and tension of the patellar tendon.

7. The three-dimensional model according to claim 2, where the intermediate bone block includes at least one embedded magnet.

8. A three-dimensional model for demonstrating a surgical procedure correcting patellar luxation, comprising:
a support including:
a base, a pair of vertical members attached to the base, a fixed element attached to each vertical member, and a movable element slidingly displaceable along each vertical member;
a healthy knee, including:
a femur including a lower portion and an upper portion rotatably coupled to one movable element, a tibia including an upper portion and a lower portion rotatably coupled to the fixed element, a patella, a quadriceps muscle coupled to the patella and the upper portion of the femur, and a patellar tendon coupled to the patella and the upper portion of the tibia; and
a diseased knee, including:
a femur including:
a body having an upper portion rotatably coupled to the other movable element, and a lower portion defining a recess including a surface having an embedded magnet,
an intermediate bone block removably disposed within the recess, and
a surface bone block, including an embedded magnet, removably disposed within the recess,
a tibia including a body having an upper portion and a lower portion rotatably coupled to the fixed element,
a patella,
a quadriceps muscle coupled to the patella and the upper portion of the femur body, and
a patellar tendon coupled to the patella and the upper portion of the tibia body.

9. The three-dimensional model according to claim 8, where:
the surface bone block has a first position associated with a pre-operative state and a second position associated with a post-operative state;
in the first position, the surface bone block is located on the intermediate bone block within the recess; and
in the second position, the surface bone block is located on the recess surface.

10. The three-dimensional model according to claim 9, where the quadriceps muscles are an elastic material, and the patellar tendons are an inelastic material.

11. The three-dimensional model according to claim 10, where the upper portion of the tibia of the diseased knee includes a movable tibia tuberosity coupled to the patella tendon.

12. The three-dimensional model according to claim 11, where:
the tibia tuberosity has a first position associated with a pre-operative state and a second position associated with a post-operative state;
in the first position, the tibia tuberosity is in-line with respect to the lower portion of the femur of the diseased knee; and
in the second position, the tibia tuberosity is canted with respect to the lower portion of the femur of the diseased knee.

13. The three-dimensional model according to claim 12, where the tibia tuberosity is movably coupled to the tibia body using a pivot, a registration key and tension of the patellar tendon.

14. The three-dimensional model according to claim 9, where the intermediate bone block includes at least one embedded magnet.

15. A three-dimensional model for demonstrating an osteotomy surgical procedure, comprising:
a support;
a first bone, coupled to the support, including:
a body defining a recess including a surface having an embedded magnet,
a removable intermediate bone block disposed within the recess, and
a removable surface bone block, disposed within the recess, including at least one embedded magnet; and
a second bone coupled to the support,
where the removable intermediate bone block and the removable surface bone block are associated with the osteotomy surgical procedure.

* * * * *